July 17, 1928.
H. R. BRISTOL
BUILDING CONSTRUCTION
Filed April 9, 1927
1,677,267
5 Sheets-Sheet 1
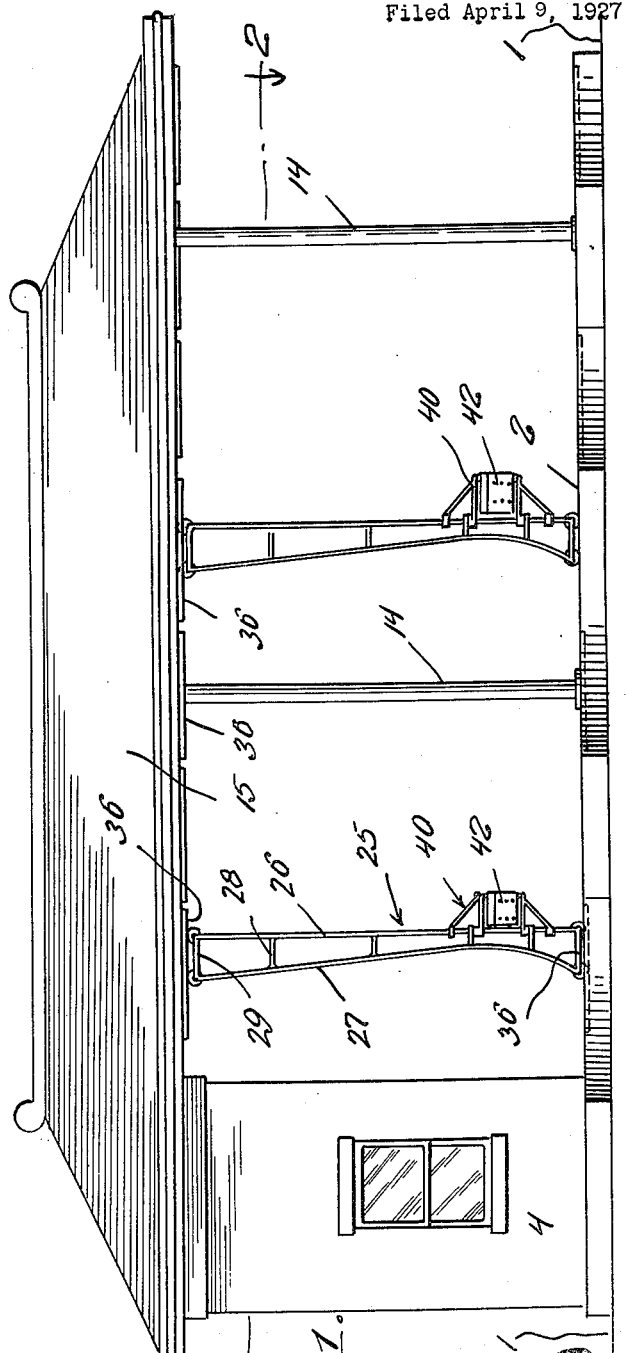
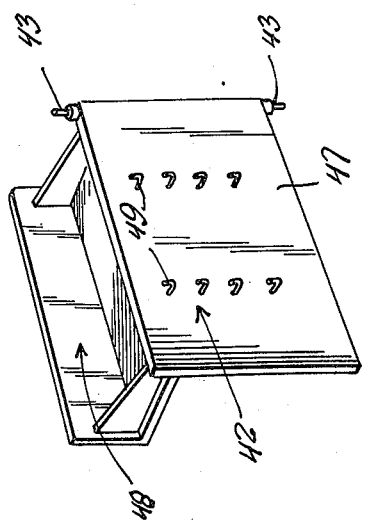
Inventor
Harry R. Bristol,
By Clarence A. O'Brien
Attorney July 17, 1928.
H. R. BRISTOL
BUILDING CONSTRUCTION
Filed April 9, 1927
1,677,267
5 Sheets-Sheet 2
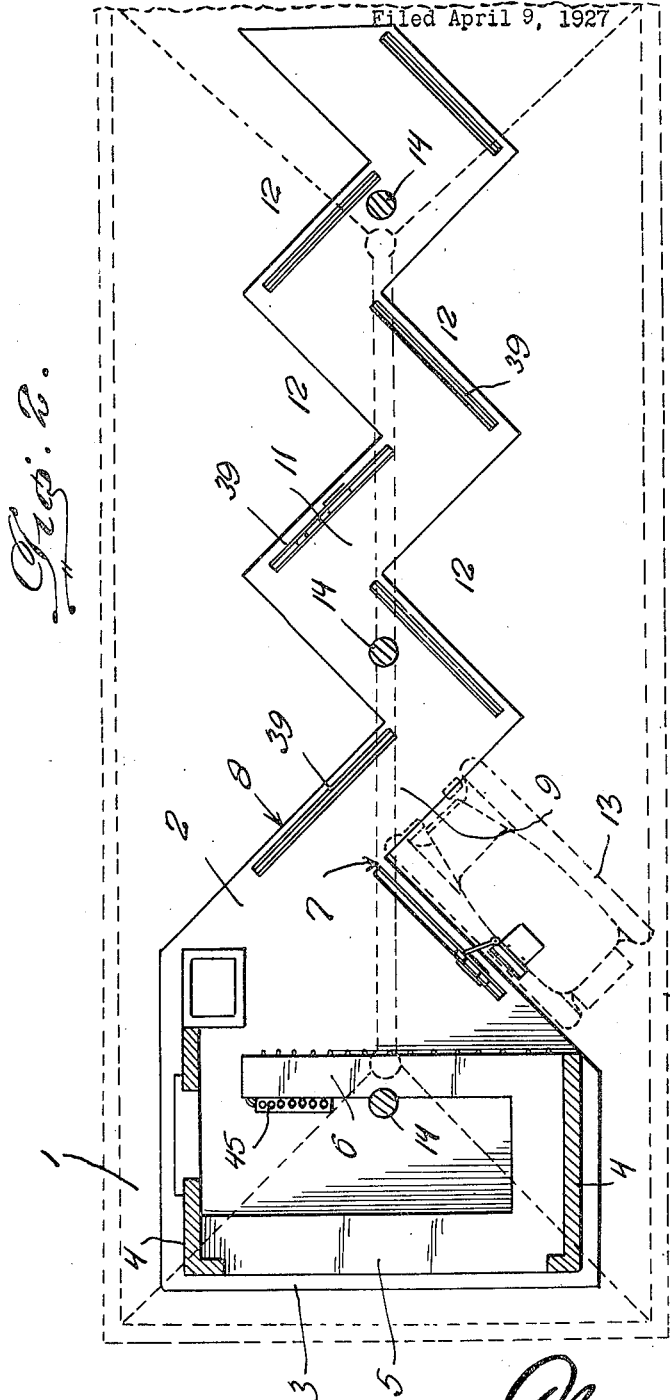
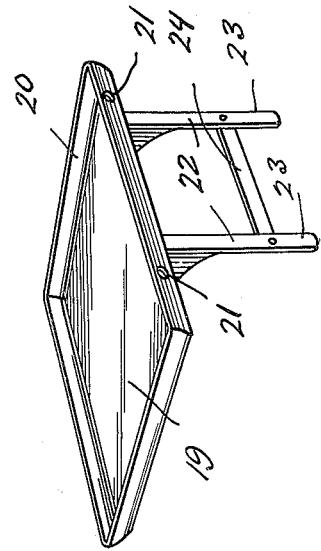
Inventor
Harry R. Bristol,
By Clarence A. O'Brien
Attorney

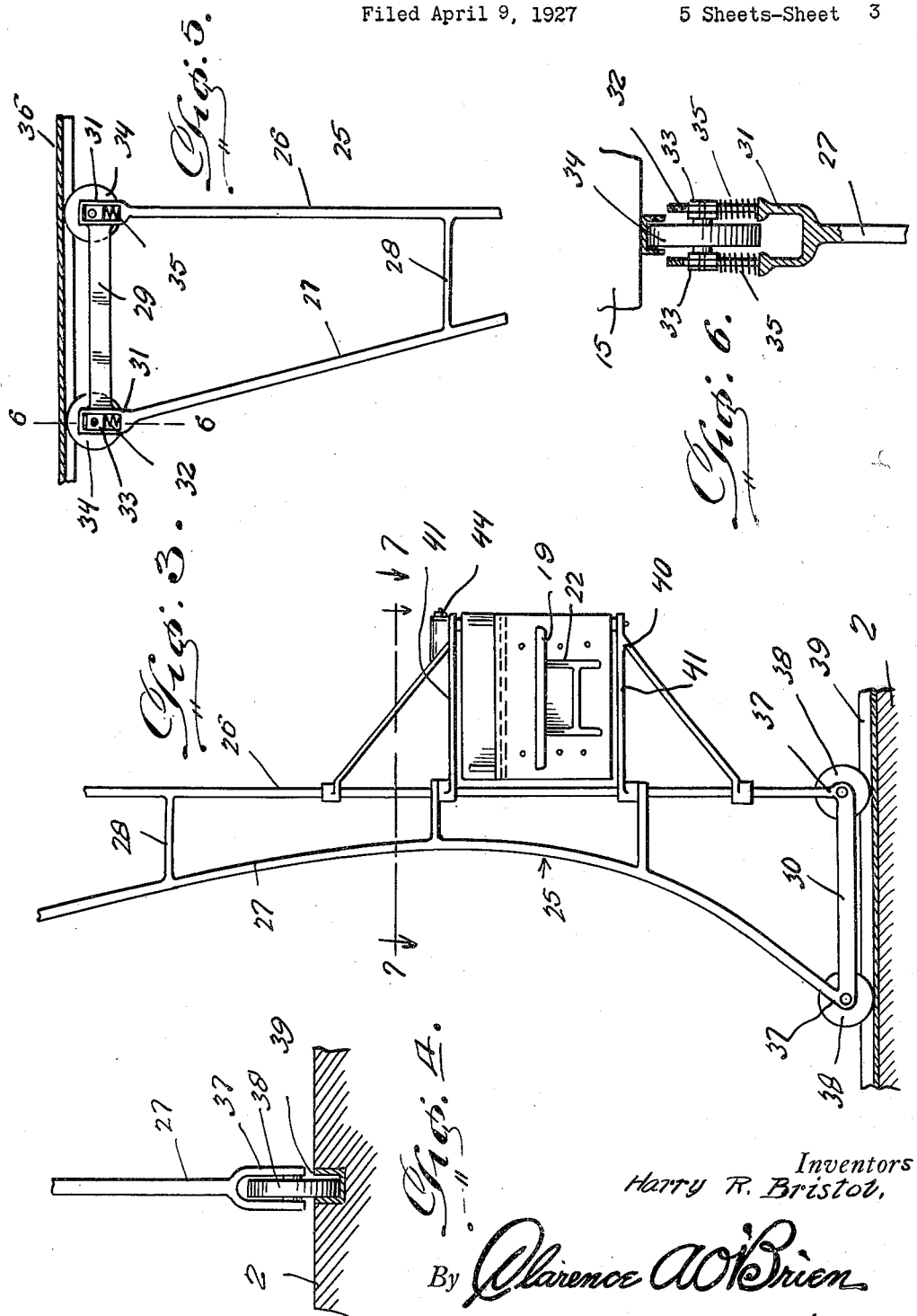

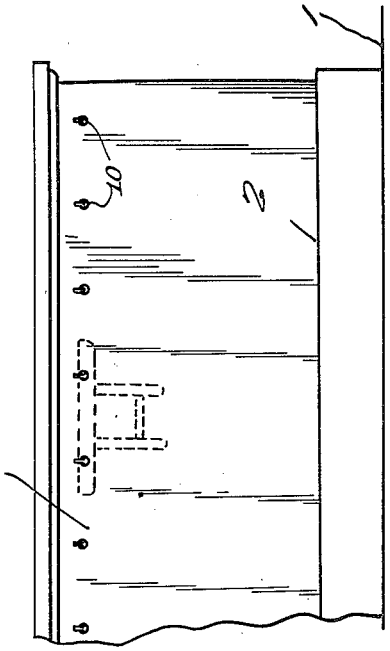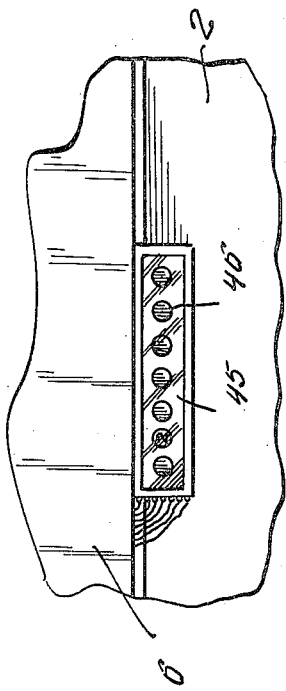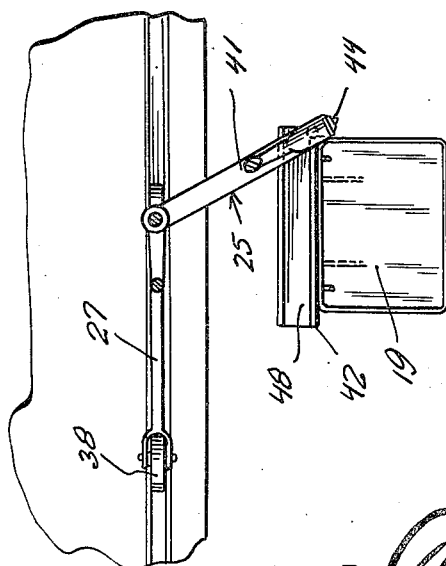

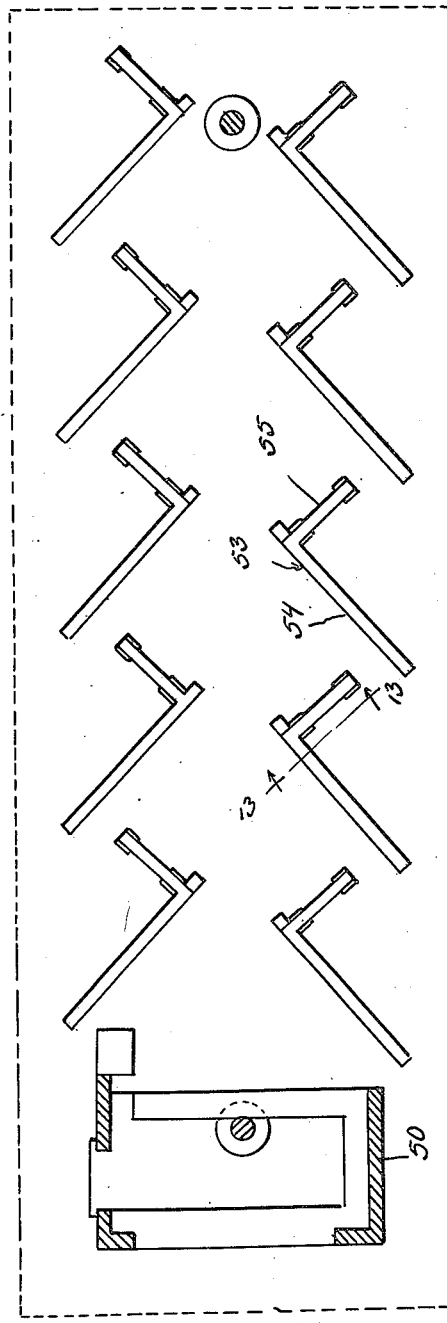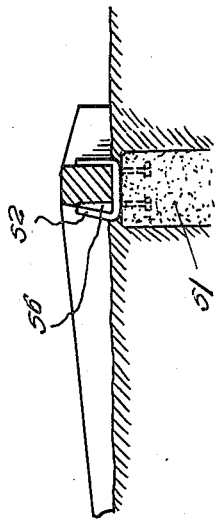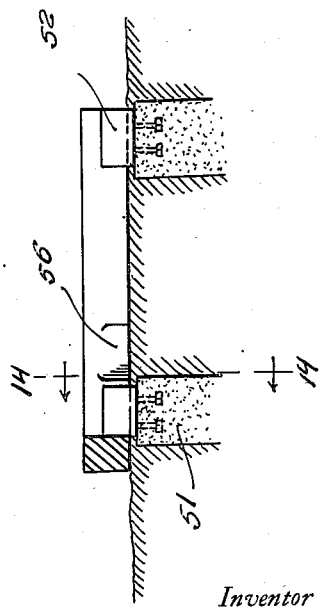

Patented July 17, 1928.

1,677,267

UNITED STATES PATENT OFFICE.

HARRY R. BRISTOL, OF FINDLAY, OHIO, ASSIGNOR OF ONE-HALF TO JAY S. BRISTOL, OF CHARLESTON, WEST VIRGINIA.

BUILDING CONSTRUCTION.

Application filed April 9, 1927. Serial No. 182,521.

This invention relates to improvement in building construction and more particularly to a building adapted to provide a shelter for motor vehicles constructed to economize space and in which various forms of service can be rendered the vehicles by their occupants with facility.

The increasing number of motor vehicles and the tendency of the public to ride in pleasure cars to transact their business, tends to purchases of various commodities and other materials which they continually use including the necessities of life and also refreshments and similar articles when on pleasure trips has created a demand on the majority of business firms, stores and the like that suitable means be provided for waiting on the automobile riding public in their cars or motor vehicles and to provide suitable storage facilities for their vehicles when making purchases in the stores.

As a result, the present invention is designed to meet a growing demand of this character as just mentioned and is adapted to provide a building construction in which the building is made so that parking of motor vehicles of prospective customers of a store, service station, or the like, and in which the proprietor can with facility serve the occupants of motor vehicles in their cars in a most convenient manner.

A further object of this invention is to provide a building construction wherein the main floor which is adapted to form a driveway for motor vehicles is provided with a platform raised any suitable distance from the floor constructed in such a manner as to permit convenient passing of automobiles adjacent to the platform from which service can be rendered in a most convenient manner by the use of a special serving apparatus forming part of the building structure which includes a roof structure supported in such a manner that the entire floor and driveway for the motor vehicles will be covered and the supporting structure for the roof suitably positioned so as not to interfere with the movement of the vehicles or service thereto from the platform.

More specifically the invention comprehends the provision of a main floor structure on which is mounted a platform having a service above the floor level at a suitable distance and on which is mounted serving apparatus of a desired character to facilitate the convenient handling of articles to be sold and served to the occupants of motor vehicles parked alongside of the platform. Together with suitable means for indicating those who have had service and those who desire service.

The invention comprehends further objects residing in the construction and arrangement of parts for providing the most economical and efficient building construction to facilitate business with occupants of a motor vehicle all of which are more particularly pointed out in the following detailed description and in the claims directed to a preferred form of the invention, it being understood, however, that various changes in the combination and arrangement of parts may be made without departing from the spirit or the scope of the invention as herein set forth.

In the drawings forming part of this application:

Figure 1 is a side elevation of the improved building construction built in accordance with this invention, Figure 2 is a horizontal sectional view taken on line 2—2 of Fig. 1, Fig. 3 is a side elevational view of the lower portion of one of the plate carriers.

Fig. 4 is a detail view showing the shank and roller structure for the bottom plate carrier and is at right angles to Fig. 3, Fig. 5 is a detailed plan portion of the tray carrier showing the manner in which supporting guide rollers are associated with the rails secured to the roof structure, Fig. 6 is a vertical sectional view on line 6—6 of Fig. 5, Fig. 7 is a sectional view taken on line 7—7 of Fig. 3, Fig. 8 is a perspective view of the tray holder, Fig. 9 is a perspective view of one of the trays, Fig. 10 is an elevational view of the serving counter showing one of the trays in dotted lines as it is supported on the front side thereof, Fig. 11 is a plan view of a portion of the serving counter showing the rear edge thereof and the indicator for the annunciator system used to indicate the places where service is desired.

Fig. 12 is a horizontal sectional view similar to Fig. 2, showing a structure in which no platform is used, and having abutment blocks positioned in a predetermined manner to define the stalls for the vehicles.

Fig. 13 is a sectional view taken on the line 13—13 of Fig. 12.

Fig. 14 is a sectional view taken on the line 14—14 of Fig. 13.

The main floor of the building is indicated at 1 which forms a main drive-way for motor vehicles as well as the main floor of the building on the central portion of which extends the platform 2 which at the left-hand end, as shown in Fig. 2, is formed in substantially rectangular form as shown at 3 having the side walls 4 extending upwardly from the opposite sides thereof and provided with front and rear counters 5 and 6 respectively. From the rear side of the rectangular portion 3 of the platform extend angular edge portions 7 and 8 respectively terminating in the angular extending portion 9 having the side pins thereof parallel to the side 8 of the platform. From this angular extension portion 9 the platform is of uniform width as illustrated in Fig. 2 and extends in zig-zag relation as shown in Fig. 2 and indicate at 11 in order to form a plurality of angularly arranged parking spaces 12 into which motor vehicles may park in angular relation from either direction and for example as shown in dotted lines at 13 in Fig. 2.

A plurality of columns 14 extend upwardly from the platform 2 in predetermined spaced relation from end to end thereof and in alinement in the central portion of the platform as clearly shown in Fig. 2. The upper ends carry the supporting structure and the roof indicated generally at 15 in Fig. 1 which terminates at its outer edge as shown by the dotted lines 16 in Fig. 2, which roof structure may be of any suitable type as now known in the art and which forms a cover projecting outwardly beyond the main floor 1 in all directions so that motor vehicles as indicated at 13 parked within the parking spaces 12 will be entirely sheltered while the occupants are receiving service in the building.

The rear face of the rear counter 6 is provided with a plurality of pairs of hooks 10 adapted to receive and support the tray shown in Fig. 9 indicated at 19 which is formed with an upstanding marginal flange 20 having the rear edge thereof formed with a pair of openings 21 which are adapted to receive the hooks 10 so that the same may be supported adjacent the upper edge of the counter 6. The under side of the tray is provided with a pair of bracket members 22 of angular form having the depending ends 23 thereof connected by the cross bar 24. These bracket members are adapted to engage the face of the counter 6 and the tray is sufficient to have the openings 21 receive the hooks so that it will be held in a substantially horizontal position on the counter 6. In this way, the articles to be purchased by the occupants of motor vehicles in the parking spaces 12 can be placed on the tray 70 and may be removed by the employee of the store and served on the tray to the motor vehicles.

Suited to receive the trays 19 and conveniently mounting the same adjacent to the motor vehicles there are provided a plurality of tray carriers generally indicated at 25 in Fig. 1 and the details of construction of which are shown in Figs. 3 to 7 inclusive.

These tray carriers include a main supporting frame having a substantially vertical upright 26 and a curved upright 27 connected by a plurality of cross bars 28 and by the bar members 29 and 30 at the upper and lower ends respectively. The upper ends of these uprights 26 and 27 are bifurcated as shown in Figs. 5 and 6 at 31 where they are formed with guide rails 32 to receive the pairs of bearing brackets 33 rotatably mounting the supporting guide wheels 34. The bearing blocks are projected upwardly, suitable coil springs 35 mounted in the openings 32 and the supporting and guide wheels are adapted to engage in the guide rails 36 formed of suitable channel arms secured to the roof structure 15 as clearly shown in Figs. 1 and 6.

The lower ends of the uprights 26 and 27 are also bifurcated as shown at 37 in Fig. 4 for receiving the supporting guide wheels 38 at the lower end of said carriers which are suitably rotatably mounted therein and have bearings engaged in the channel bars 39 provided in the platform 2 as shown in Fig. 4. These channel bars 39 are in parallel relation to the channel bars 36 and extend along parallel with the edge portions of the platform adjacent to the parking spaces 12 as clearly shown in Fig. 2.

A frame-supporting frame 40 is rotatably mounted on the upright 26 as shown in Fig. 3 at a predetermined position above the platform 2 and between the parallel arms 41 of which are rotatably mounted the tray holder 42. This tray holder 42 is provided with a pair of studs 43 projecting from the upper and lower edges thereof as shown in Fig. 8 which engages bearings in the ends of the arms 41 while the entire holder is of such a size that it will swing between the arms 41 as shown in Fig. 3 so that in any position of rotation the tray holder will not contact with the vertical upright 26 or any portion of the frame-supporting frame 40. Above the upper arm 41 is mounted a suitable push-button structure as indicated at 44 which is electrically connected by suitable circuit wires with an annunciator 45 mounted on the inside face of the counter 6 as shown in Fig. 2 and illustrated sufficiently in detail in Fig. 11 which annunciator has a plurality of indicating openings 46 with which may be associated suitable movable indicators adapted to be operated upon operation of a push-button on the tray carrier to indicate the button on which of the several tray carriers has been operated so that the proprietor of the store will be able to determine which of the motor vehicles in the parking spaces 12 desires service. Any suitable form of electrical annunciator system may be employed in this building construction for this purpose as already well known in the art.

The tray holders 42 each comprises vertical panel members 47 which carry the studs 43 as clearly shown in Fig. 8 of the drawings and one side of the upper end portion of which is mounted a receptacle 48 adapted for receiving articles to be used by the customer or motorist in a desired manner. On the opposite face of the panel 47 is secured a plurality of pairs of hook members 49, the hooks of each pair being arranged in alined relation and in a relatively vertical plane with respect to the hooks of the other pairs. In this way a plurality of pairs of hooks is provided at different horizontal planes on the panel 47 which are spaced apart a distance sufficient to receive the openings 21 of the tray member 19. It will be thus seen that the tray member 19 may be applied to any pair of hooks 49 while the bracing structure 22 will engage the face of the panel 47 and support the tray 19 in a horizontal position on the tray holder.

With particular reference to Figs. 2 and 7 in the above description it will be seen that the swinging frame 40 of the tray carrier 25 is adapted to be moved outwardly beyond the edge of the platform 2 towards the side of a motor vehicle parked in one of the spaces 12 and that in this position as shown in either Fig. 2 or Fig. 7 the tray holder may be swung to a suitable position alongside of the motor vehicle so that the tray 19 will project through the window of a closed motor vehicle or over the doors of an open vehicle in order that the articles placed on the tray may be readily used by the occupants of the vehicle in a most convenient manner. The movable tray carrier 25 movably mounted on the wheel structure as heretofore described in the track, as shown in Fig. 2, parallel to the edge of the platform permits the positioning of the tray carriers in any desired manner with respect to vehicles parked in one of the spaces 12 in order that the swinging frame 40 and the tray holder may be positioned so that the tray will project through the window of a closed car. In view of the varying height of the doors and the bodies of different types of motor vehicles now in use the pairs of hooked members 49 for receiving trays 19 at different horizontal levels will permit the positioning of the trays 19 on the tray holder in such a manner that they can be readily swung through the window of a closed motor vehicle regardless of the height of the doors or the body in view of the provision of the numerous pairs of hooks which may be arranged on the tray holders in such a manner as to support the tray at any height necessary for reception of any type of motor vehicle now is use.

The platform 2 provides in a zig-zag form a suitable pathway for the attendants to wait on the patrons of the store who desire to make purchases direct from their motor vehicles and who carry the trays 19 hang them on the pairs of hooks 17 on the counter 6 after taking the order for merchandise, refreshments or other articles desired by respective purchasers or customers of the store which are placed on the trays, and then carried by the attendants and placed on the tray holders so that suitable and convenient service may be afforded the patrons of the store in a most convenient and expeditious manner.

For refreshments, the tray provides a proper mount for glasses and other receptacles to prevent accidental spilling of the contents as is frequently the case in handling refreshments in serving patrons in their motor vehicles.

In addition the roof structure 15 provides the proper protection from the sun, and in order that patrons of the store may park with comfort while waiting and being served.

With particular reference to Figs. 12 to 14 inclusive, a booth with serving counters is indicated at 50 in which construction no platform is used, the driveway and floor surface all being on the same level. In order to provide the parking pocket similar to pocket 12, suitable anchors 51 in the form of blocks of concrete or the like are embedded in the ground or floor surface in pairs in spaced angular relation as may be ascertained from Fig. 12.

Retaining members of U-shaped construction indicated at 52 are secured to these upper ends of these anchors 51 and having the legs converging toward the upper ends.

Pocket forming members 53 of substantial L-shape have an elongated side portion 54 and an abutment member 55 extending laterally from one end portion. This abutment member is trapezoidal in section and is adapted to slidably engage in the retaining members 52 which hold the pocket forming members in place in the relative positions shown in Fig. 12.

The portion 55 adjacent to the elongated side 54 is provided with a grooved portion at 56 as shown in Figs. 13 and 14 so that the abutment member may be readily removed from the retaining members without sliding the abutment member the entire length through both retaining members, but merely moving the abutment members to the left as shown in Fig. 13, a sufficient distance to register the grooved portion 56 with the adjacent retaining members, following which the same may be lifted upwardly and removed from the retaining members.

The tray carrier may be used with this construction by mounting the same adjacent to the pocket forming members 53 through the formation of the track members on the floor adjacent to members 53 in the same manner as shown in Fig. 2.

It will be seen that this construction eliminates the formation of special curbing and special shaped platform thereby eliminating the use of a substantial amount of material, reducing the cost of construction of the building, and yet contains the same advantages as the structures shown in Figs. 1 and 2.

With this structure as shown in Figs. 12 to 14, the roof structure and other features will remain the same as heretofore described in connection with Figs. 1 and 2.

From this description it should thus be readily appreciated that highly novel form of building construction for serving motorists in their cars has been provided by which service can be maintained in an efficient and expedient manner.

What is claimed is:

1. A building construction, comprising a platform, a roof supported on said platform in spaced relation above the same, a tray carrier movably mounted adjacent the edge portion of the platform between the platform and said roof structure, the tray holding means pivotally mounted on said tray carrier for removably receiving the trays.

2. A building construction, comprising a platform, a roof structure mounted over said platform in spaced relation thereto, track members mounted on the roof structure and platform in parallel relation and adjacent to the edge of the platform, a tray carrier mounted in and between the tracks and removably engaged therewith, a supporting frame member pivotally mounted on the tray carrier, and a tray holder pivotally mounted in the free ends of the supporting frame adapted to removably support a tray member thereon for universal adjustment in a horizontal plane in a predetermined manner.

3. In a device of the class described, a tray carrier comprising an open frame-work, a support, means movably and detachably mounting said frame in said support, a supporting flange pivotally mounted on the same member tray carrier at one end thereof, a tray holder journaled in the opposite end of said tray carrier, and a plurality of attaching means provided on said tray-holder for receiving and detachably connecting a tray therewith.

4. A device of the class described, comprising a support, a pair of guide rails mounted in spaced parallel relation on said support, an elongated frame member forming a tray carrier, a pair of rollers journaled in one end of said carrier for bearing engagement in one of said tracks, and a pair of rollers having their axes movably mounted to the end of the frame for detachable connection with the other track members, a swinging supporting frame pivotally mounted on the frame of the tray carrier at one end and having a pair of spaced parallel arms projecting outwardly from the tray carrier, a tray holder journaled at one end in the free ends of the arms of the supporting flange, said tray holder including a plate member and a plurality of hook members arranged in pairs thereon in varying horizontal planes and a tray adapted to be detachably mounted thereon.

5. A building construction comprising a floor, a platform mounted on said floor having its side formed into a plurality of inwardly extending recesses with the end of each recess angularly arranged, a track arranged parallel adjacent one end of each of said recesses, a tray supporting carriage movably mounted on the track and a roof supported above said platform providing a cover for the same and said track.

6. A building construction comprising a floor, a platform mounted on said floor having its side formed into a plurality of inwardly extending recesses with the wall of each recess angularly arranged, a plurality of columns projecting upwardly from said platform in spaced alined relation, a roof supported on said column providing a cover for said platform, a track section arranged parallel adjacent one edge of each of said recesses, a track section suspending from the roof in vertical alinement with each of said first named track sections and a vertically disposed tray supporting carriage having its opposite ends movably mounted on said upper and said lower track sections.

In testimony whereof I affix my signature.

HARRY R. BRISTOL.